US006766823B2

(12) United States Patent
Hong

(10) Patent No.: US 6,766,823 B2
(45) Date of Patent: Jul. 27, 2004

(54) VALVE APPARATUS FOR HERMETIC COMPRESSOR

(75) Inventor: Myung-jung Hong, Gwangju (KR)

(73) Assignee: Samsung Gwangju Electronics, Co., Ltd., Gwangju (KR)

( * ) Notice: Subject to any disclaimer, the term of this patent is extended or adjusted under 35 U.S.C. 154(b) by 88 days.

(21) Appl. No.: 10/242,461

(22) Filed: Sep. 13, 2002

(65) Prior Publication Data

US 2003/0066563 A1 Apr. 10, 2003

(30) Foreign Application Priority Data

Oct. 10, 2001 (KR) .......................................... 2001-62384

(51) Int. Cl.[7] .............................................. F16K 21/10
(52) U.S. Cl. ......................... 137/514; 137/856; 251/64
(58) Field of Search ................................ 137/514, 855, 137/856, 857, 858; 251/64

(56) References Cited

U.S. PATENT DOCUMENTS

| 1,768,638 | A | * | 7/1930 | Sheats ........................ 137/514 |
| 2,302,447 | A | * | 11/1942 | King et al. .................. 137/514 |
| 3,939,867 | A | * | 2/1976 | Lundvik et al. ............. 137/514 |
| 4,749,340 | A | * | 6/1988 | Ikeda et al. .................. 137/514 |
| 5,228,468 | A | * | 7/1993 | Kapadia ....................... 137/514 |
| 5,647,395 | A | * | 7/1997 | Hashimoto et al. .......... 137/514 |
| 6,314,990 | B1 | * | 11/2001 | Brabek et al. ............... 137/514 |
| 6,701,961 | B2 | * | 3/2004 | Okuyama et al. ........... 137/856 |

* cited by examiner

Primary Examiner—John Rivell
(74) Attorney, Agent, or Firm—Blank Rome LLP

(57) ABSTRACT

A valve apparatus for a hermetic compressor including a valve plate having a refrigerant discharging hole for discharging a refrigerant, a discharging valve having one end fixed at the valve plate and another end for opening and closing the refrigerant discharging hole, a stopper having one end fixed at the valve plate in order to support the discharging valve, a keeper disposed at an upper part of the stopper at a predetermined distance from the stopper and fixed at the valve plate, a first shock absorbing means for buffering an opening and a closing of the stopper by being disposed at the keeper, and a second shock absorbing means disposed at the keeper in order to move up and down. The second shock absorbing means is for buffering the opening and the closing of the stopper together with the first shock absorbing means.

5 Claims, 2 Drawing Sheets

US 6,766,823 B2

VALVE APPARATUS FOR HERMETIC COMPRESSOR

FIELD OF THE INVENTION

The present invention relates to a valve apparatus for a hermetic compressor, and more particularly, to a valve apparatus for a hermetic compressor capable of improving the discharging efficiency of a refrigerant, and reducing abrasion and noise generated by the valve apparatus.

BACKGROUND OF THE INVENTION

Generally, a hermetic compressor includes a reciprocal compressor, a linear compressor, and a rotary compressor. Most of the compressors have a valve apparatus for preventing a refrigerant from being drawn into a compressing chamber.

The valve apparatus of a conventional reciprocal compressor associated with hermetic compressors is shown in FIG. 1. As shown in FIG. 1, the valve apparatus comprises a valve plate 10 having a refrigerant discharging hole 10a being disposed between a cylinder block (not shown) and a cylinder head (not shown), a discharging valve 11 disposed at the valve plate 10, a stopper 13, and a keeper 15.

One end of the discharging valve 11 and the stopper 13 are connected to an outer surface of the valve plate 10. The stopper 13 has a longer length than that of the discharging valve 11. The keeper 15 is placed above the stopper 13 and is protuberant upwardly. A free end of the stopper 13 contacts a bend portion of the keeper 15, particularly when the compressor is operating.

In the above construction, a refrigerant is compressed by a piston (not shown) and discharged through the discharging hole 10a. At this time, the discharging valve 11 is pressed against the stopper 13 as the discharging valve 11 is opened by the pressure of the discharging refrigerant. The stopper 13 is repeatedly pressed against the keeper 15 as the center of the stopper 13 is bent by the discharging pressure.

Additionally, the discharging force and noise can be reduced by reducing the movement of the discharging valve 11, as the free end of the stopper 13 is stopped by the bent portion of the keeper 15. In other words, when the compressor operates, the level of the discharging force and the noise of the valve apparatus can be controlled by adjusting the height of the keeper 15 and the size of the refrigerant discharging hole 10a.

However, the keeper 15 and the discharging valve 11 are fixed in the above valve apparatus, and the height of the keeper 15 and the size of the discharging valve 11 cannot be adjusted. This makes it difficult to find an appropriate point to allow the discharging valve 11 to be opened in accordance with the discharging pressure of the refrigerant.

Moreover, as the size of the refrigerant discharging hole 10a formed at the valve plate 10 is varied in accordance with the amount of the refrigerant, a valve plate 10 having a standardized refrigerant discharging hole 10a size cannot be manufactured. Accordingly, valve plates 10 having various dimension and specifications must be manufactured to meet each particular situation.

SUMMARY OF THE INVENTION

The present invention has been made to overcome the above-mentioned problems of the related art. Accordingly, it is an object of the present invention to provide a valve apparatus of a hermetic compressor having an improved structure for freely adjusting a height of the valve in accordance with a discharging pressure and discharging amount of refrigerant.

The valve apparatus of the hermetic compressor according to the present invention comprises a valve plate having a refrigerant discharging hole for discharging a refrigerant, a discharging valve having one end fixed at the valve plate and another end for opening and closing the refrigerant discharging hole, a stopper having one end fixed at the valve plate in order to support the discharging valve, a keeper fixed at the valve plate and disposed at an upper part of the stopper at a predetermined distance, a first shock absorbing means disposed at the keeper for buffering the opening and closing of the stopper, and a second shock absorbing means disposed at the keeper in order to move up and down. The second shock absorbing means is for buffering the opening and closing of the stopper together with the first shock absorbing means.

In the preferred embodiment, the first shock absorbing means includes a spring disposed at a lower part of the keeper and a shock absorbing plate supported at the spring and connected with the stopper in order to buffer the stopper. The second shock absorbing means includes a cylinder disposed at the keeper and a piston having one end connected with the first shock absorbing means and another end that reciprocates in the cylinder. Additionally, in the preferred embodiment the cylinder is an air cylinder.

BRIEF DESCRIPTION OF THE DRAWINGS

The object and the feature of the present invention will be more apparent by describing the preferred embodiment of the present invention by referring to the appended drawings, in which.

DETAILED DESCRIPTION OF THE PREFERRED EMBODIMENT

The preferred embodiment of the present invention will be described referring to the accompanying drawings.

Figure 1:
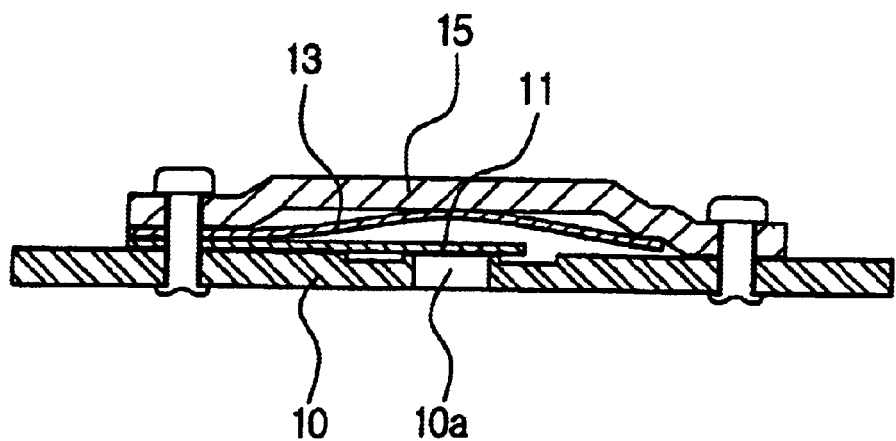
FIG. 1 is a partial sectional view schematically showing a valve apparatus of a conventional hermetic compressor.
Figure 2:
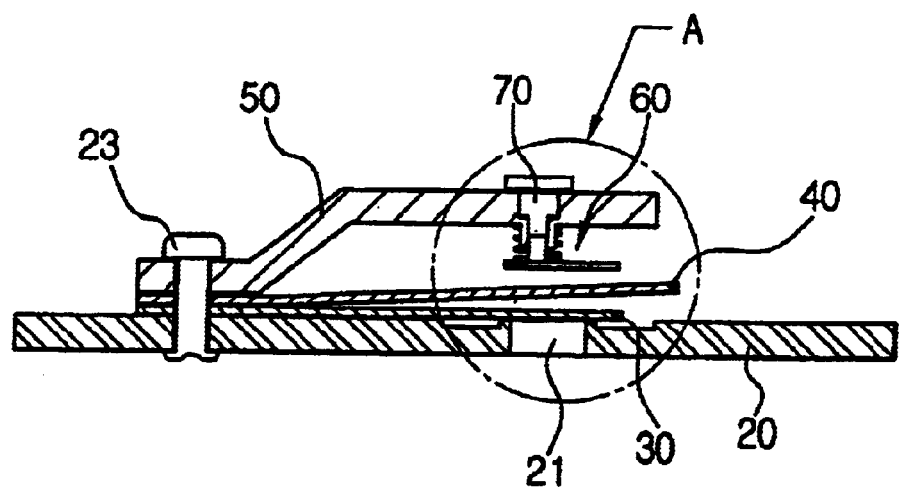
FIG. 2 is a partial sectional view schematically showing a valve apparatus of a hermetic compressor according to a preferred embodiment of the present invention.

Referring to FIG. 2, a valve apparatus according to the preferred embodiment of the present invention comprises a valve plate 20 having a refrigerant discharging hole 21 for discharging a refrigerant, a discharging valve 30 disposed at the valve plate 20, a stopper 40, a keeper 50, a first shock absorbing means 60 disposed at the keeper 50, and a second shock absorbing means 70 also disposed at the keeper 50.

The valve plate 20 is disposed between a cylinder block (not shown) and a cylinder head (not shown). In FIG. 2, the cylinder block is connected to a lower part of the valve plate 20 and the cylinder head is connected to an upper part of the valve plate 20. Therefore, the refrigerant compressed in a cylinder chamber of the cylinder block is discharged to a refrigerant discharging chamber of the cylinder head through the refrigerant discharging hole 21.

One end of the discharging valve 30 is fixed at the valve plate 20, while the other end opens and closes the refrigerant discharging hole 21. One end of the stopper 40 is fixed at the valve plate 20 in order to support the discharging valve 30. In other words, one end of the stopper 40 is fixed at the valve plate 20 together with the discharging valve 30 while the other end is adjacent the discharging valve 30. The stopper 40 has a longer length than the discharging valve 30.

The keeper 50 is disposed at an upper part of the stopper 40 with one end fixed at the valve plate 20, with the stopper 40 and the discharging valve 30, by a settlement pin 23. The keeper 50 is protuberant upwardly and has a predetermined distance from the stopper 40.

Figure 3:
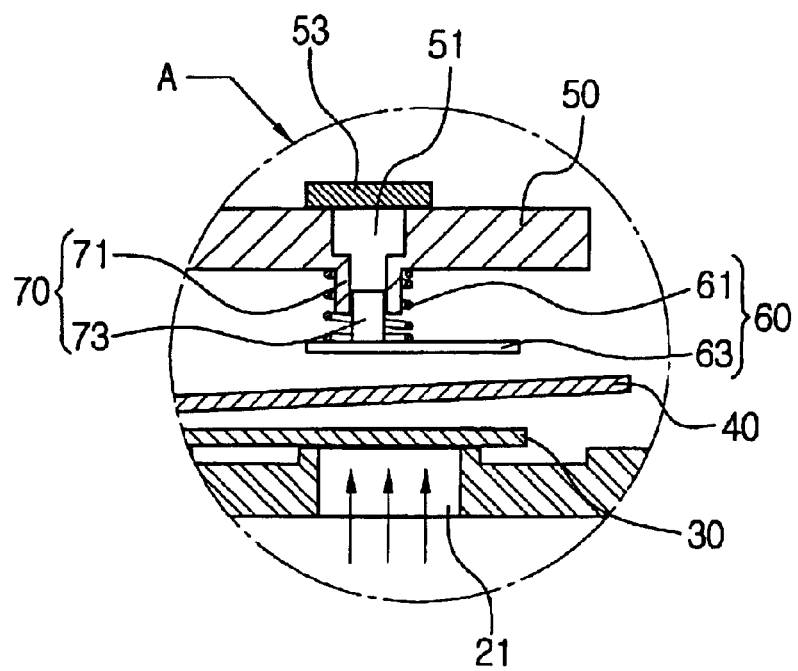
FIG. 3 is an enlarged view of the part "A" of FIG. 2 in a first position.

The first shock absorbing means 60 is disposed at the keeper 50, and buffers the opening and a closing of the stopper 40. As shown in FIG. 3, the first shock absorbing means 60 has a spring 61 disposed at a lower part of the keeper 50 and a shock absorbing plate 63 supported by the spring 61. The shock absorbing plate 63 absorbs the force of the stopper 40, which is pushed upwardly by the opening of the discharging valve 30. By contacting the stopper 40, the shock absorbing plate 63 is able to control the height of the discharging valve 30 when it opens.

The second shock absorbing means 70 has a pipe-like cylinder 71 disposed at the keeper 50, and a piston 73 disposed at the cylinder 71 for reciprocation. One end of the cylinder 71 is fixed at the keeper 50. The cylinder 71 extends to a lower part of the keeper 50 and includes an air chamber 51 formed at the keeper 50. An upper part of the air chamber 51 is shielded by a cover 53, the cover 53 being connected to an upper part of the keeper 50. The spring 61 is connected around an outer part of the cylinder 71. It is preferable that the cylinder 71 is an air cylinder.

One end of the piston 73 is connected to the shock absorbing plate 63 with its other end reciprocally connected in the cylinder 71. The piston 73 absorbs the force of the stopper 30 as it is compressed due to the force generated by the stopper 30 contacting the shock absorbing plate 63. In other words, the force transferred from the stopper 30 to the shock absorbing plate 63 is first absorbed by the spring 61, and then absorbed by the up and down movement of the piston 73.

Hereinbelow, the operation of the valve apparatus of the hermetic compressor according to the preferred embodiment of the present invention having the above construction will be described.

Figure 4:
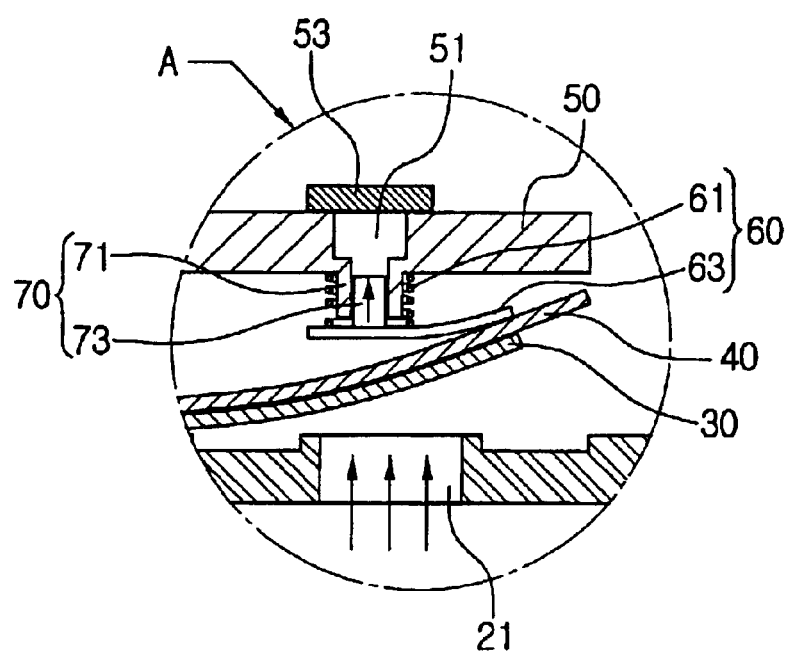
FIG. 4 is the enlarged view of the part "A" of FIG. 2 in a second position.

First, when the compressor operates as shown in FIG. 3, the discharging valve 30 is pushed upwardly as the refrigerant is discharged by a predetermined pressure through the refrigerant discharging hole 21. Then, as shown in FIG. 4, the discharging valve 30 engages the stopper 40, which then contacts the shock absorbing plate 63. After that, the shock absorbing plate 63 is pushed upwardly and the force is initially reduced by the spring 61.

Furthermore, as the piston 73 connected with the shock absorbing plate 63 is pushed upwardly, the air in the cylinder 71 is compressed, and the force of the discharging valve 30 transferred to the shock absorbing plate 63 is further absorbed.

The extent of the opening and the closing of the discharging valve 30 can be automatically adjusted at this time by adjusting the elevation height of the stopper 40 in accordance with the pressure of the refrigerant discharged through the refrigerant discharging hole 21. Therefore, the opening and the closing of the discharging valve 30 is automatically adjusted regardless of the size of the refrigerant discharging hole 21, and there is no need to prepare various valve apparatuses having refrigerant discharging holes with a various sizes in accordance with the discharging amount.

Moreover, the noise is reduced since the spring 61 and the piston 73 absorb and buffer the high-frequency noise generated by the discharging valve 30 and the stopper 40, as they contact the shock absorbing plate 63.

As described so far, the degree to which the discharging valve is opened can be adjusted without adjusting the height of the keeper due to the buffering of the spring and the piston. Accordingly, the production cost is reduced as the specification of the refrigerant discharging hole of the valve plate is standardized.

An additional advantage is that the noise is reduced as the spring and the piston buffer the high-frequency noise generated when the discharging valve is opened.

Although the preferred embodiment of the present invention has been described, it will be understood by those skilled in the art that the present invention should not be limited to the described preferred embodiment. Various changes and modifications can be made within the spirit and scope of the present invention as defined by the appended claims.

What is claimed is:

1. A valve apparatus for a hermetic compressor, comprising:

a valve plate having a refrigerant discharging hole for discharging a refrigerant;

a discharging valve having one end fixed at the valve plate and another end for opening and closing the refrigerant discharging hole;

a stopper having one end fixed at the valve plate and adjacent the discharging valve;

a keeper fixed to the valve plate and disposed at an upper part of the stopper at a predetermined distance from the stopper;

a first shock absorbing means disposed at the keeper and buffering an opening and closing of the stopper; and a second shock absorbing means disposed at the keeper and able to move up and down, the second shock absorbing means buffering the opening and the closing of the stopper together with the first shock absorbing means.

2. The valve apparatus for a hermetic compressor of claim 1, wherein the first shock absorbing means includes:

a spring disposed at a lower part of the keeper; and a shock absorbing plate connected to the spring and engaging the stopper in order to buffer the stopper.

3. The valve apparatus for a hermetic compressor of claim 1, wherein the second shock absorbing means includes:

a cylinder disposed at the keeper; and a piston having one end connected with the first shock absorbing means and another end that reciprocates in the cylinder.

4. The valve apparatus for a hermetic compressor of claim 2, wherein the second shock absorbing means includes:

a cylinder disposed at the keeper; and a piston having one end connected with the absorbing plate and another end connected in the cylinder in order to reciprocate.

5. The valve apparatus for a hermetic compressor of claim 3, wherein the cylinder is an air cylinder.

\* \* \* \* \*